Sept. 27, 1960  C. W. LINCOLN  2,953,932
VARIABLE RATIO STEERING GEAR
Filed Sept. 19, 1957  2 Sheets-Sheet 1

INVENTOR.
Clovis W. Lincoln
BY
J. C. Thorpe
ATTORNEY

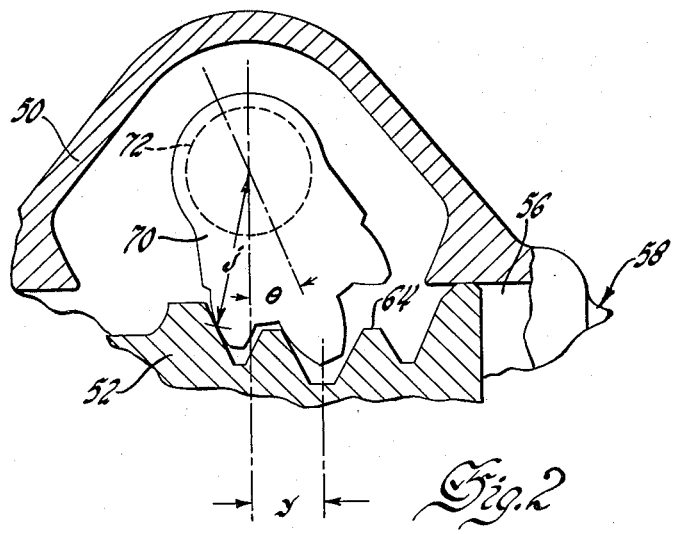
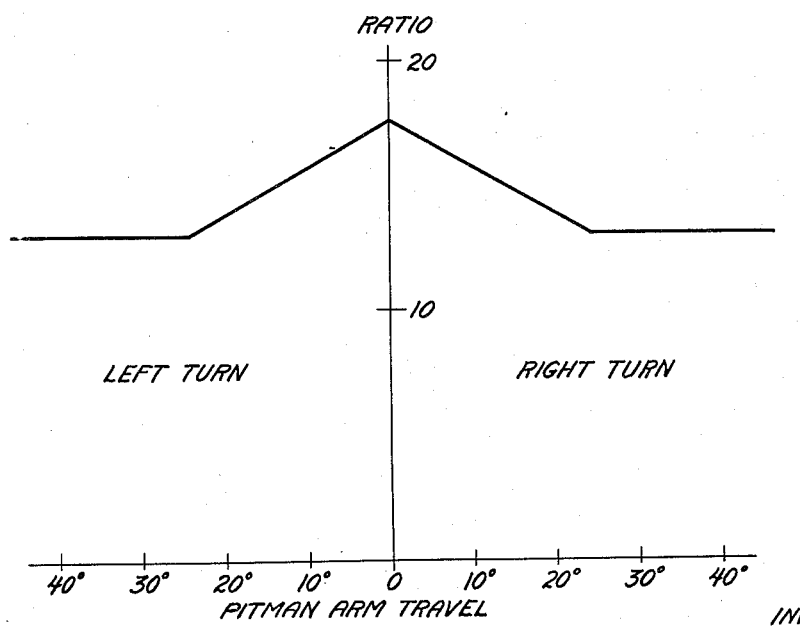

United States Patent Office 2,953,932
Patented Sept. 27, 1960

2,953,932

VARIABLE RATIO STEERING GEAR

Clovis W. Lincoln, Saginaw, Mich., assignor to General Motors Corporation, Detroit, Mich., a corporation of Delaware Filed Sept. 19, 1957, Ser. No. 684,929

2 Claims. (Cl. 74—388)

This invention relates to power steering and more particularly pertains to a power steering gear incorporating a racked piston, the teeth of which engage the teeth of a gear sector through which the steering linkage of the vehicle is actuated.

Before power steering, and beginning particularly with the introduction of the "balloon tire," steering gear ratios were substantially increased so as to lessen the effort required at the steering wheel. Further increases were subsequently made as tires became still larger and as automobiles became generally heavier with higher front end loadings. Thus, steering gear ratios upwards of 23:1 were not uncommon, requiring as many as five or six complete turns of the steering wheel to carry the dirigible wheels from lock to lock—an obvious inconvenience.

With the advent of power steering, it became possible to decrease the steering ratio to substantially any desired figure; but, for safety reasons, it was deemed advisable to effect the reduction gradually from year to year with an ultimate goal of perhaps 8–12:1. Further experimentation and study, however, have compelled the conclusion that with such a ratio the steering gear in the case of a majority of drivers is overly sensitive through the area corresponding to the incidental steering required to maintain a vehicle on a straight course when traveling a straight or substantially straight roadway.

In accordance with the present invention, I answer to the indicated problem by providing in a power steering steering gear as above generally defined a varying ratio whereby, in operation of the vehicle, relatively more turns of the steering wheel are required through the center area to swing the dirigible wheels a given number of degrees than are required to swing the dirigible wheels such number of degrees when the dirigible wheels are already displaced to an extent whereat the steering parts are displaced from center in one direction or the other. Most preferably, the ratio decrease off-center is progressive to the point of a predetermined minimum figure which may hold through a selected distance near the lock positions. As a result of my invention, the sensitivity of the steering gear is substantially optimum under straight-ahead highway conditions while, during parking and maneuvering in close quarters, the necessary angular displacements of the dirigible wheels can be effected without excessive turning of the steering wheel.

The invention will be better understood through reference to the accompanying drawings illustrating preferred forms thereof.

In the drawings:

Fig. 2 illustrates the operation of the embodiment shown in Fig. 1; and

Fig. 3 is a graph illustrating the operating characteristics of a steering gear conforming to the invention.

Figure 1:
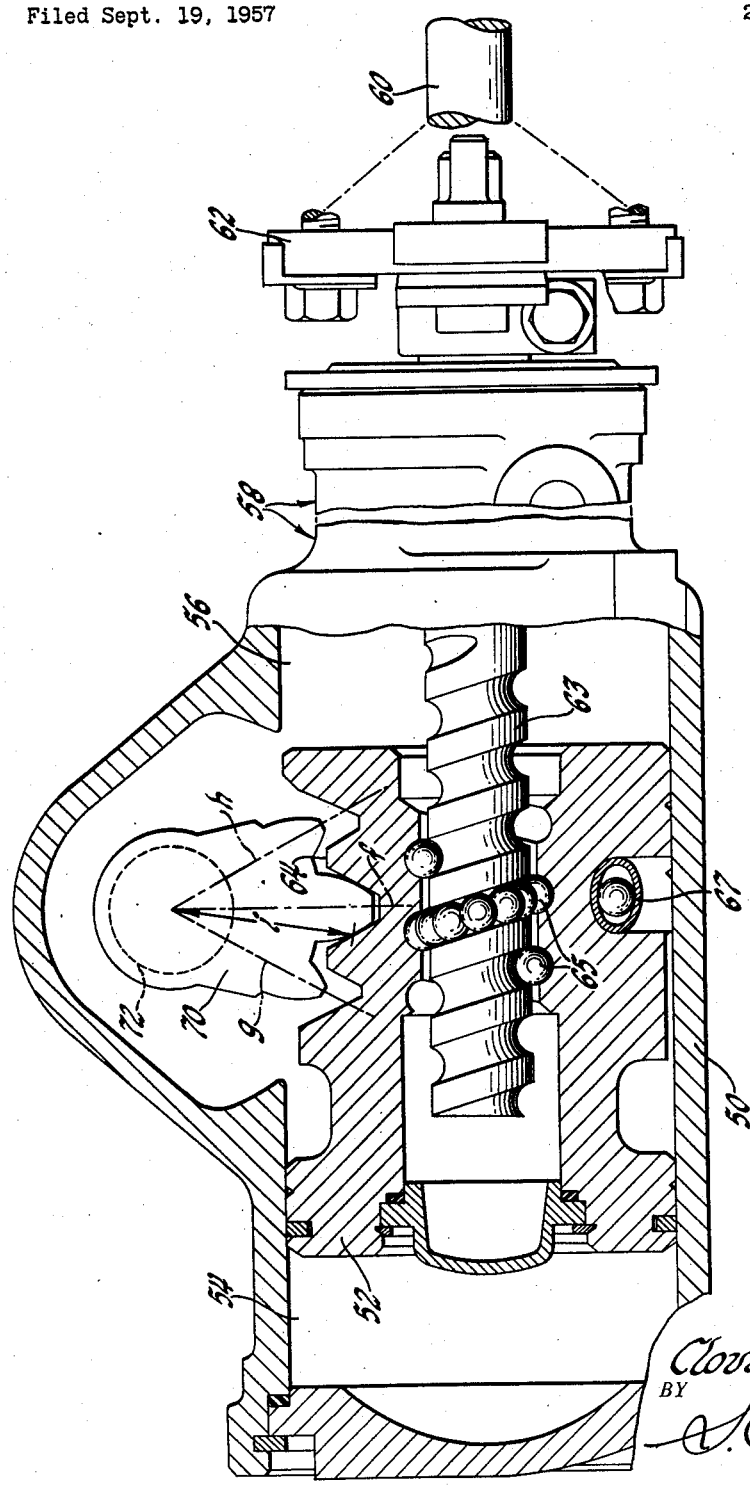
Fig. 1 is a longitudinal view partly in section showing a power steering gear incorporating the invention.

Referring first to Figure 1, the numeral 50 indicates a power cylinder which confines a double-acting piston 52 delineating working chambers 54 and 56. Fluid flow to such chambers is under the control of a valve (not shown) disposed within the cylinder extension 58. This valve becomes displaced in response to rotation of the steering shaft 60 the angular movement of which is transmitted through a flexible coupling 62 of the type disclosed, for example, in Burton Patent 2,753,848, granted July 10, 1956. Suitable conduits, not shown, are, of course, provided between the valve and the chambers 54 and 56. The valve body, not shown, is connected to a worm 63, the worm in turn being operably connected to the piston 52 via balls 65 which, in operation of the gear, travel a helical course set by the worm groove and a complementary groove formed within the piston. A return tube 67 allows for recirculation of the balls.

In accordance with the invention, piston 52 is provided with rack teeth 64 generated on a concave pitch circle. These teeth mesh with the teeth of a specially formed sector 70 fixedly secured to or integral with an output or cross shaft 72. The teeth of the gear sector provide what amount to lever arms $f$, $g$ and $h$, lever arm $f$ being substantially longer than lever arms $g$ and $h$ which are of the same length. With this arrangement; i.e., displacement of the piston and sector from their center positions shown is marked by a decreasing mechanical advantage, i.e., shortening of the effective leverage, with the result that as the shaft 60 is rotated to move the piston linearly on the worm 63, successive increments of movement of the piston rotates the gear sector a greater number of degrees than the preceding increment of movement of the piston. The consequent drop in the steering ratio off-center in either direction is illustrated by Fig. 4 which is believed self explanatory.

Fig. 2 shows the sector and piston of Fig. 1 displaced from center. From a comparison of this figure with Fig. 1, it will be seen that whereas at the beginning of the linear movement of the piston to the right the effective leverage is approximately $i$, at the stage represented by Fig. 2 the effective leverage is approximately $j$—a substantial drop. $\theta$ and $Y$ in Fig. 2 indicate, respectively, the angular displacement of the gear sector from center and linear displacement of the rack from center. In the manufacture of a typical gear conforming to the invention a gear generating chart, such as Table 1 below, may be followed:

Table 1

| Angular Displacement of Sector From Center $\theta$ | Linear Displacement of Rack From Center $Y$ | Angular Displacement of Sector From Center $\theta$ | Linear Displacement of Rack From Center $Y$ |
|---|---|---|---|
| 0° | 0 | 26° | .6254 |
| 2° | .0521 | 28° | .6693 |
| 4° | .1033 | 30° | .7124 |
| 6° | .1540 | 32° | .7552 |
| 8° | .2040 | 34° | .7972 |
| 10° | .2534 | 36° | .8389 |
| 12° | .3020 | 38° | .8799 |
| 14° | .3501 | 40° | .9203 |
| 16° | .3974 | 42° | .9602 |
| 18° | .4444 | 44° | .9996 |
| 20° | .4904 | 46° | 1.0384 |
| 22° | .5361 | 48° | 1.0770 |
| 24° | .5810 | 50° | 1.1148 |

Having thus described and illustrated my invention, what I claim is:

1. A steering gear power jack comprising a cylinder, a cross shaft journaled in said cylinder and carrying a gear sector positioned therewithin, a piston reciprocal within said cylinder and having rack teeth in engagement with the teeth of said sector, a manually rotatable member, and means operably interconnecting said member and said piston, said rack teeth being generated on a concave pitch line, the teeth of said sector being generated in a manner providing lever arms of different effective lengths, whereby in operation of the jack relatively more turns of said manually-rotatable member are required through the center area of the gear teeth connection to rotate said cross shaft a given number of degrees than are required in the off-center areas to rotate such shaft a like number of degrees.

2. A steering gear power jack comprising a cylinder, a cross shaft journaled in said sylinder and carrying a gear sector positioned therewithin, a piston within said cylinder having rack teeth in engagement with the teeth of said sector, said piston having a helically grooved axial bore, a steering worm extending into said bore, a train of balls in the helical course formed by the groove in the piston and the worm groove, and means carried by the piston providing for recirculation of said balls, said rack teeth being generated on a concave pitch line, the teeth of said sector being generated in a manner providing lever arms of different effective lengths, whereby in operation of the jack relatively more turns of said worm are required through the center area of the gear teeth connection to rotate said cross shaft a given number of degrees than are required in the off-center areas to rotate such shaft a like number of degrees.

References Cited in the file of this patent

UNITED STATES PATENTS

| | | |
|---|---|---|
| 1,567,997 | Ross | Dec. 29, 1925 |
| 2,159,225 | Phelps et al. | May 23, 1939 |
| 2,587,495 | MacDuff | Feb. 26, 1952 |
| 2,865,339 | Bishop | Dec. 23, 1958 |